(12) United States Patent
Ylönen

(10) Patent No.: US 10,523,674 B2
(45) Date of Patent: Dec. 31, 2019

(54) ACCESS RELATIONSHIP IN A COMPUTER SYSTEM

(71) Applicant: SSH Communications Security OYJ, Helsinki (FI)

(72) Inventor: Tatu Ylönen, Espoo (FI)

(73) Assignee: SSH COMMUNICATIONS SECURITY OYJ, Helsinki (FI)

( * ) Notice: Subject to any disclaimer, the term of this patent is extended or adjusted under 35 U.S.C. 154(b) by 0 days.

(21) Appl. No.: 15/631,621

(22) Filed: Jun. 23, 2017

(65) Prior Publication Data

US 2017/0289164 A1    Oct. 5, 2017

Related U.S. Application Data

(63) Continuation of application No. 14/657,595, filed on Mar. 13, 2015, now Pat. No. 9,722,987.

(51) Int. Cl.
*H04L 29/06* (2006.01)
*G06F 21/45* (2013.01)
*H04L 9/08* (2006.01)

(52) U.S. Cl.
CPC .............. *H04L 63/10* (2013.01); *G06F 21/45* (2013.01); *H04L 9/08* (2013.01); *H04L 9/0891* (2013.01);
(Continued)

(58) Field of Classification Search
None
See application file for complete search history.

(56) References Cited

U.S. PATENT DOCUMENTS 5,887,063 A    3/1999  Varadharajan et al.
6,212,511 B1   4/2001  Fisher et al.
(Continued)

FOREIGN PATENT DOCUMENTS

WO    WO-2013009621 A1    1/2013
WO    WO-2013093209 A1    6/2013

OTHER PUBLICATIONS

Extended European Search Report issued by the European Patent Office in relation to European Application No. 16159016.1 dated Jul. 16, 2016 (7 pages).
(Continued)

*Primary Examiner* — Maung T Lwin
(74) *Attorney, Agent, or Firm* — Carter, DeLuca & Farrell LLP; Robert P. Michal

(57) ABSTRACT

Various mechanisms can be used for authorizing access between entities in a computing environment. Configuring such access may involve configuration data stored on one or more of the computing devices or stored externally to the computing devices. Various aspect are disclosed herein for collecting, analyzing, correlating, organizing, storing, using and/or displaying such information, for example in the form of pre-analyzed access relationships between entities in the computing environment. In accordance with an aspect access-related configuration information is collected from a plurality of entities and an access relationship between two or more entities is determined based on the configuration information. Information about the determined access relationship is stored in a non-volatile storage. The information identifies a source entity and a destination entity and the determined access relationship defines a user account associated with the source entity and authorized to log into a user account associated with the destination entity.

27 Claims, 11 Drawing Sheets

(52) U.S. Cl.
CPC .............. *H04L 63/06* (2013.01); *H04L 63/08* (2013.01); *G06F 2221/2141* (2013.01)

(56) References Cited

U.S. PATENT DOCUMENTS

| | | | |
|---|---|---|---|
| 6,301,661 B1 | 10/2001 | Shambroom | |
| 6,851,113 B2 | 2/2005 | Hemsath | |
| 7,035,281 B1* | 4/2006 | Spearman | H04L 12/4604 |
| | | | 370/401 |
| 7,380,123 B1* | 5/2008 | Hernacki | G06F 21/31 |
| | | | 709/229 |
| 7,552,467 B2* | 6/2009 | Lindsay | G06F 21/31 |
| | | | 713/165 |
| 7,653,810 B2 | 1/2010 | Thornton et al. | |
| 7,765,309 B2* | 7/2010 | Spearman | H04L 51/12 |
| | | | 709/229 |
| 8,015,594 B2 | 9/2011 | Salowey et al. | |
| 8,214,884 B2 | 7/2012 | Xia et al. | |
| 8,327,421 B2* | 12/2012 | Ting | H04L 9/3231 |
| | | | 713/186 |
| 8,539,562 B2 | 9/2013 | Bolik et al. | |
| 8,539,567 B1 | 9/2013 | Logue et al. | |
| 8,584,195 B2* | 11/2013 | Sherlock | H04L 63/1425 |
| | | | 726/1 |
| 8,661,250 B2* | 2/2014 | Hernacki | G06F 21/31 |
| | | | 713/154 |
| 9,729,514 B2* | 8/2017 | Lemaster | H04L 63/08 |
| 2002/0161604 A1 | 10/2002 | Kardos et al. | |
| 2003/0033521 A1 | 2/2003 | Sahlbach | |
| 2004/0168066 A1 | 8/2004 | Alden | |
| 2005/0081029 A1 | 4/2005 | Thornton et al. | |
| 2006/0206922 A1 | 9/2006 | Johnson et al. | |
| 2006/0236096 A1 | 10/2006 | Pelton et al. | |
| 2006/0248082 A1 | 11/2006 | Raikar et al. | |
| 2006/0259950 A1 | 11/2006 | Mattsson | |
| 2007/0083665 A1 | 4/2007 | Miao | |
| 2007/0118735 A1 | 5/2007 | Cherrington et al. | |
| 2007/0245013 A1 | 10/2007 | Saraswathy et al. | |
| 2007/0250920 A1* | 10/2007 | Lindsay | G06F 21/31 |
| | | | 726/7 |
| 2008/0133376 A1 | 6/2008 | Hill | |
| 2008/0184349 A1* | 7/2008 | Ting | H04L 9/3231 |
| | | | 726/7 |
| 2008/0222416 A1 | 9/2008 | Kiwimagi et al. | |
| 2008/0281699 A1 | 11/2008 | Whitehead | |
| 2009/0138703 A1 | 5/2009 | Schneider | |
| 2010/0235635 A1 | 9/2010 | Kshirsagar et al. | |
| 2010/0325717 A1* | 12/2010 | Goel | H04L 63/102 |
| | | | 726/11 |
| 2011/0038482 A1 | 2/2011 | Singh et al. | |
| 2011/0185055 A1 | 7/2011 | Nappier et al. | |
| 2011/0252459 A1 | 10/2011 | Walsh et al. | |
| 2011/0302400 A1 | 12/2011 | Maino et al. | |
| 2012/0151563 A1 | 6/2012 | Bolik et al. | |
| 2012/0204032 A1* | 8/2012 | Wilkins | H04L 9/006 |
| | | | 713/170 |
| 2013/0111561 A1 | 5/2013 | Kaushik | |
| 2013/0117554 A1 | 5/2013 | Ylonen | |
| 2013/0174238 A1* | 7/2013 | Wang | H04N 21/25816 |
| | | | 726/7 |
| 2013/0298192 A1 | 11/2013 | Kumar et al. | |
| 2013/0326059 A1* | 12/2013 | Gourlay | H04L 43/04 |
| | | | 709/224 |
| 2014/0157405 A1* | 6/2014 | Joll | H04L 63/1425 |
| | | | 726/22 |
| 2014/0208394 A1* | 7/2014 | Goodwin | H04L 63/102 |
| | | | 726/4 |
| 2014/0289830 A1* | 9/2014 | Lemaster | H04L 63/08 |
| | | | 726/7 |
| 2014/0317409 A1 | 10/2014 | Bartok | |
| 2015/0222604 A1 | 8/2015 | Ylonen | |
| 2015/0242594 A1 | 8/2015 | Harjula et al. | |
| 2015/0271158 A1 | 9/2015 | Ronca | |
| 2016/0134423 A1 | 5/2016 | Harjula et al. | |

OTHER PUBLICATIONS

"An SSH Key Management System: Easing the Pain of Managing Key/User/Account Associates", International Conference on Computing in High Energy and Nuclear Physics, Journal of Physics, Journal of Physics: Conference Series 119, IOP Publishing, 2008 (pp. 1-6).

Venafi, Inc., "Venafi Encryption Director, SSH Key Management Guide," Manual booklet, printed Jul. 27, 2011 (114 pages).

Stonegate 5.0 Firewall/VPN Evaluator's Guide, Stonesoft, Secure Information Flow, 12 pages—2009.

Key Management Interoperability Protocol (KMIP) Addressing the Need for Standarization in Enterprise Key Management, Version 1, May 20, 2009.

SSH Tectia, SSH Tectia ® Manager 6.1 Product Description, Dec. 15, 2010.

Module SSH Auth Patterns—Puppet. Puppet Labs, Dec. 29, 2009.

Kent, Greg: Unsecured SSH—The Challenge of Managing SSH Keys and Association, SecureIT Whitepaper, 2010.

Dell-Michael, Setting up Certificate Authority Keys with OpenSSH version 5.4+, Sep. 8, 2011 (pp. 1-3).

Puppet SSH:Auth Module Source Code, Downloaded from Sourceforge Apr. 3, 2013.

XP002342178, Applied Cryptography, Second Edition, Passage, Jan. 1, 1996, Applied Cryptography: Protocols, Algorithms and Source Code in C, John Wiley & Sons, New York, (pp. 56-59).

SSH Communications Security Corporation, "Universal SSH Key Manager™ 1.4, Administrator Manual," printed Feb. 27, 2015 (330 pages).

Robert A. Napier—Cisco Systems, "Secure Automation: Achieving Least Privilege with SSH, Sudo and Setuid", 2004 LISA XVIII—Nov. 14-19, 2004—Atlanta, GA, pp. 203-212 (10 pages).

Christopher Thorpe, Yahoo!, Inc., "SSU: Extending SSH for Secure Root Administration", 1998 LISA XII—Dec. 6-11, 1998—Boston, MA, pp. 27-36 (11 pages including cover page).

* cited by examiner

ACCESS RELATIONSHIP IN A COMPUTER SYSTEM

This is a Continuation of U.S. patent application Ser. No. 14/657,595 filed Mar. 13, 2015, the entire disclosure of each of which is incorporated herein by reference.

FIELD OF THE INVENTION

This disclosure relates to access relationships between entities in a computer system.

BACKGROUND

Large computing environments can comprise a plurality of entities such as computing devices, user accounts and users. Computer devices are often called hosts. A host may also be a virtual computing device or a container such as a Linux™ container or equivalent within a physical computing device. Each host may comprise or be associated with one or more user accounts, processes, and/or files. Hosts, user accounts, and other entities in the environment may be associated with groups, e.g., user groups.

Various arrangements for accessing entities in computing environment by other entities can be configured. Example of these include web-based access, security protocol (e.g. secure shell protocol; SSH) based access, file transfer access, remote procedure call access, and/or software upgrade access. Such access may be used by, e.g., end users, automation, and/or by system administrators.

Many ways are of effectively configuring and/or gaining access to a particular entity such as a computing device or a set of computing devices can be employed. The different ways of configuring access include configuring by using local files on a server (possibly in combination with local clients on the client device), configuration information in directories (e.g., Active Directory, LDAP (Lightweight Directory Access Protocol) directories, NIS (Network Information System) directories), and/or databases. Many forms of configuration can be used simultaneously. Often configuration further relies on configuration data not necessarily perceived as a part of access configuration, such as DNS (Domain Name Service), DHCP (Dynamic Host Configuration Protocol), shared file system configuration, and even configuration of switches and routers in the network.

Access relationships can be formed between various entities. An access relationship is understood to refer to a relationship between a source entity and a destination entity such that the access from the source entity to the destination entity is permitted. Access relationships are hence sometimes called trust relationships.

Computer systems can provide information on access relationships between entities based on information of keys used by the entities. It is possible to collect information on keys, for example SSH (Secure Shell) keys, associate private keys with corresponding public keys, and visualize the resulting graph on a computer screen. However, known systems can suffer from scalability problems in their analysis and display of access relationships configured using e.g. SSH keys. Furthermore, known systems are not able to represent any other kinds of access relationships than the SSH key based relationships or combine such other relationships with SSH key based relationships.

Information of existing access relationships in an organization would often be desirable. For example, it can be of great importance for an organization or the like to be aware who can access what data and systems in the organization. Large organizations may have thousands, even more than a hundred thousand servers, and thousands or even millions of user accounts. This can be the case especially when counting in system-local service accounts. There is thus a need for solutions that for processing access information at sufficient scale, accuracy, and generality.

SUMMARY OF THE INVENTION

According to an aspect there is provided a method in a computerized system comprising collecting access-related configuration information from a plurality of entities in the computerized system, determining an access relationship between two or more entities based on the configuration information, and storing, in a non-volatile storage, information about the determined access relationship, wherein the information identifies a source entity and a destination entity and the determined access relationship defines a user account associated with the source entity and authorized to log into a user account associated with the destination entity.

According to another aspect there is provided an apparatus comprising at least one processor, and at least one memory including computer program code, wherein the at least one memory and the computer program code are configured, with the at least one processor, to cause the apparatus to collect access-related configuration information from a plurality of entities in a computerized system, determine access relationships between two or more entities based on the configuration information, and store, in a non-volatile storage, information about the determined access relationship, wherein the information for an access relationship identifies a source entity and a destination entity and the determined access relationship defines a user account associated with the source entity and authorized to log into a user account associated with the destination entity.

According to yet another aspect there is provided non-volatile computer-readable memory comprising a data structure, the data structure comprising at least one object representing a host, at least one object representing a user account on a host, and a plurality of access relationship objects representing access relationships between source and destination entities, wherein a source entity can access a destination entity and the access relationship objects comprise identifications of objects representing identifications of objects representing user accounts as the source entities and identifications of objects representing user accounts as the destination entities.

Further aspects are disclosed in the detailed description below and the appended dependent claims.

DETAILED DESCRIPTION OF THE INVENTION

Figure 11:
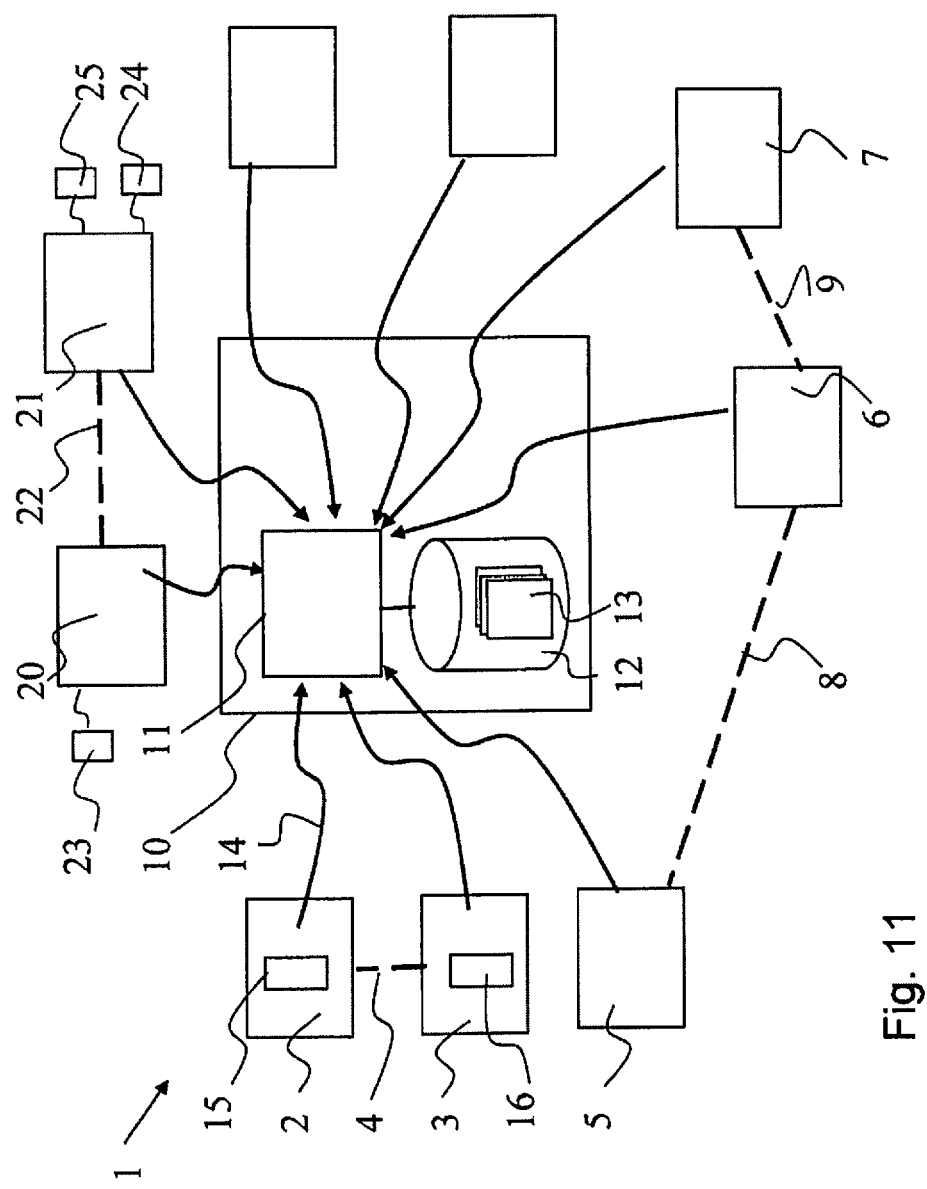
FIG. 11 shows an example of a computer system.

In the following certain examples relating to various aspects of access relationships in a computerized system are described with reference to the appended drawings where FIG. 11 shows an example of such a system. The system can be understood as a computer, virtual machine, or a set of computers or virtual machines and other associated components, together with associated software.

FIG. 11 shows a central data processing apparatus 10. A plurality of entities, for example data processing entities 2, 3, 5 6, 7, 20, 21 connected to the central data processing apparatus 10 are also shown. It is noted that the number of data processing entities in the system can be considerably greater than what is shown in FIG. 11. The data processing apparatus is shown to comprise at least one processor 11 and at least one memory 12. The memory can be arranged to store records or files 13.

The central data processing apparatus 10 is configured to provide management operations such as information collection, information analysis, information correlation, access relation discovery, storing of access relationship information, using access relationship information, displaying access relationship information, and/or actively managing access relationships.

In some specific examples at least a part of the operations is provided by an apparatus configured to operate as a key manager. In this description the term "key manager" refers to a system for managing automated access without being restricted to managing of keys.

According to an aspect access relationship information is computed and stored in the system 1 based on configuration information. Apparatus 10 can be configured to collect access-related configuration information from the plurality of entities and determine access relationships between the entities based on the configuration information. In FIG. 11 the information collection is illustrated by single headed arrows 14. Access-related configuration information can be collected from the plurality of entities, including all entities or a parts of entities connected to apparatus 10. For example, it is possible to collect the information from many thousands of hosts and for many thousands or even millions of user accounts and/or users. The information is then analyzed by the processor 11 and correlated to identify access relationships between different entities.

An access relationship refers herein to a relation between a source entity and a destination entity where it is possible to access the destination entity from the source entity In FIG. 11 example access relationships are denoted by the dashed lines 4, 8, 9 and 22. Of these access relationship 4 is between source entity 2 and destination entity 3. Access relationship 22 is between source entity 20 and destination entity 21. Access relationships 8 and 9 denote situation where there is a pivoting entity 6 between a source entity 5 and destination entity 7.

An entity can have at least one associated user account. User account can comprise information for a particular user which can be a human and/or a machine, or a group of users. A user account can define an identity that is authorized to perform predefined actions. A user account typically be accessed by a given entity or entities. The accessing entity can be a human or a machine. Location of the user account can depend on the type thereof.

In FIG. 11 entities 2 and 3 are shown to comprise user accounts 15 and 16, respectively. Entity 20 is shown to be associated with user account 23 that is not physically comprised within the entity. Entity 21 is shown to be similarly associated with at least two user accounts 24 and 25. A user can be authorized to access a destination entity and log into a user account associated with the destination entity. Each access relationship can be associated with a source entity (e.g., user account, group, and/or host) and destination entity (e.g., user account, group, or host) to which login from the source entity is permitted. The access relationship data may also identify other information, such as relevant source and destination configuration information (e.g., identity key and authorized keys file entry, Kerberos keytab file entry, or host-based authentication configuration entry, authorized principal name), source restriction, command restriction, certificate, trust anchor (e.g., certificate authority), and/or identification of a key pair used for configuring the access relationship (e.g., one or more fingerprints for the key pair).

The determined access relationships can be stored in a non-volatile storage 12. This is advantageous for various reasons. For example, there is no need to re-compute the information if there is a need to boot the apparatus for whatever reason. Also, because the access relationship data is permanently stored it can be used in analysis of the system, for example in comparisons for determining changes in dynamic environment. The stored information about the determined access relationship can identify the source entity and destination entity.

Figure 1:
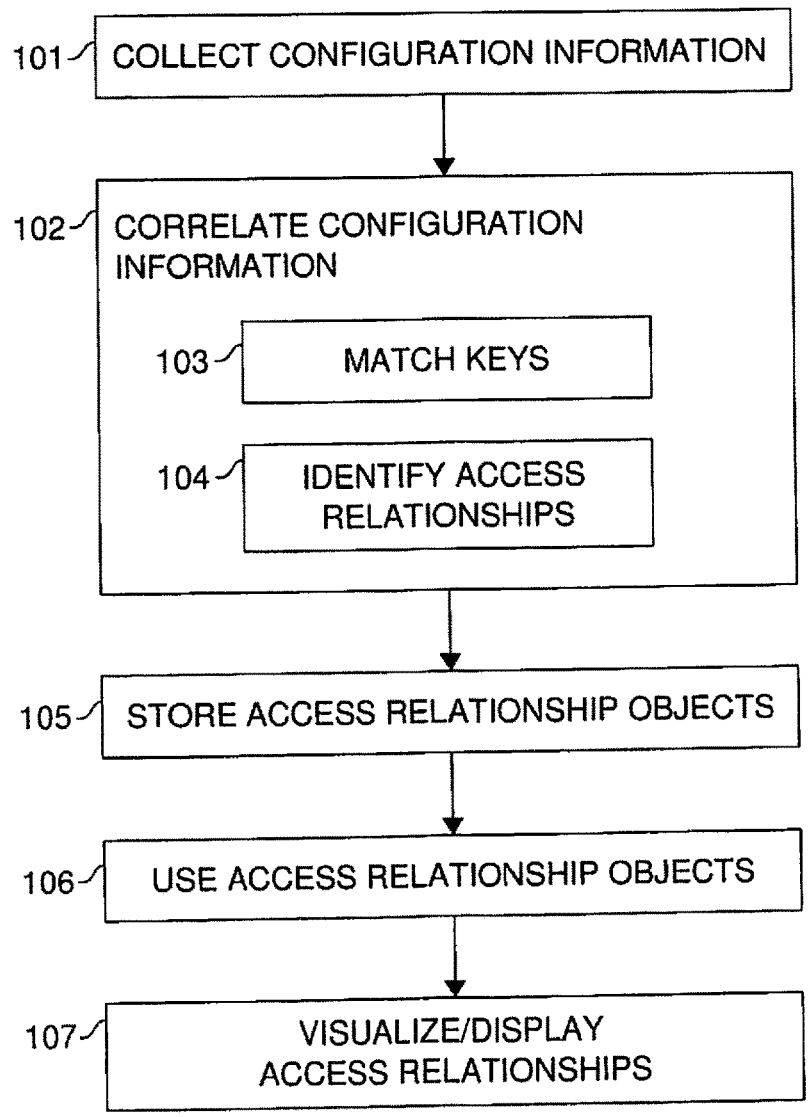
FIG. 1 illustrates a process of collecting, analyzing, correlating, storing, using, and displaying access-related configuration information.

FIG. 1 illustrates an example of a method for collecting, analyzing, correlating, storing, using, and displaying access relationship information. The method can be provided e.g. by a key manager. Information can be collected from a large number of hosts and/or directories in a computing environment.

Step 101 illustrates collecting configuration information from hosts, file systems, directories, and/or other sources. It could, for example, fetch SSH authorized keys files, SSH configuration files, and SSH identity key files, or other type of security authenticators such as certification information. The collection could be performed, e.g., using an agent program running on one or more hosts, using a data collection script that is executed on one or more hosts, or using an SSH connection to execute commands on a host. Information could also be collected by reading directories (e.g., using the LDAP protocol (Lightweight Directory Access Protocol)). For example, authorized keys may be stored in a directory and collected from the directory using the LDAP protocol. Information may be collected on a continuous or period basis, and later steps may be rerun and stored values updated in response to changes in the collected information.

102 illustrates analyzing and correlating the collected configuration information to interpret how various authentication mechanisms, automatic access credentials, automatic access authorizations, and other relevant system properties are configured. The properties can be such as directories, filters for information coming from directories such as specification of a base distinguished name, or limitations on which hosts in a domain a user account is to exist. It is noted that a domain in this context may mean a Kerberos or Active Directory domain. The analysis step may also comprise parsing of information received from a host and processing log data. The analysis results may also influence data collection, such as collecting information from directories configured in a configuration file.

The analyzing can comprise stage 103 for correlating various pieces of collected information to stage 104 where it is identified what access relationships exist within the computing environment. It is also possible to identify these across the boundaries of the environment to/from external hosts. Correlating may also compare new information against earlier information to more accurately determine how access relationships and related information have changed. The correlating may, e.g., compare fingerprints or public keys of configured authorized keys to fingerprints or public keys of configured identity keys to identify that an access relationship may exist from the entity for which the identity key to the entity for which the authorized key is configured.

Generally, an access relationship authorizes a source entity to access another entity, for example in the form of logging into the other entity. Once logged in, the access may be used for, e.g., transferring files between the source entity and the destination entity, executing commands on the destination entity, changing the configuration of the destination entity, or interacting with a program running on the destination entity. Access may be restricted in what operations may be performed using the access. Such restrictions may also be identified by analyzing the collected configuration information. For example, the options configured for an authorized key, such as the "from" and "command" options can be looked at.

For example, an access relationship using SSH keys may be configured using an identity key on the client, an authorized key or an entry or line in an authorized keys file on the server (both referring to the same key pair), and more indirectly by an SSH client configuration file on the client (specifying which identity key files to use) and the SSH server configuration file on the server (specifying where to look for authorized keys files). It may also be partly configured in directories, such as in LDAP directory when authorized keys are stored in LDAP, or certificates when the access relationship is configured using certificates and/or principal names.

For Kerberos-based access relationships, the credential may be, e.g., the actual password from a keytab file, or a principal name that can be used for fetching the desired password from a keytab file.

For access relations based on host-based authentication, configuration information for the access relations is typically a line in a file called ".shosts", ".rhosts", "shosts.equiv", "hosts.equiv". The credential may then be considered to be, e.g., the client-side user name on the client-side host (e.g., "user1@host1").

It is noted that in this specification terms credential and authenticator are used interchangeably.

When a source or destination identifies a group, an access relationship may be stored as referencing an object representing the group, or alternatively, as referencing each of the members of the group, or as multiple access relationships, one for each member of the group. Combinations of the approaches are also possible. Generally, the group may be expanded either during the correlating/storing operations, or when access relationships are used and displayed. Expanding a group may involve, e.g., an SQL query to find group members from a database, or one or more LDAP queries to a directory to determine its members.

Storing of information about access relationships takes place at 105. At least part of the stored information may result from the correlating. The information may be stored in a database, such as PostgreSQL, Oracle, or MS SQL Server. Non-relational databases and files may also be used. The information is advantageously stored in non-volatile storage for future reference. Stored information about access relationships may be in the form of database records referencing a source entity, a destination entity, a credential, and potentially other information (such as configuration data elements used for configuring the access relationship). The referenced entities may be stored as, e.g., object identifiers, links, data structures within the access relationship entity, or as separate objects that reference the access relationship entity (i.e., the reference could be in the reverse direction). Source and destination entities may be, e.g., users, hosts, or groups of users or hosts.

Stored information may also comprise configuration entities, such as authorized keys from an authorized keys file on a host, identity keys, .rhosts files, or keytab file entries. The credential may identify, e.g., a key pair. A key pair may be identified, e.g., by one or more of its fingerprints, by its public key, or by a reference to an object identifying a key pair in a database. The credential may also identify a certificate containing a principal name or a certificate specifying a trust anchor (trusted certificate authority). Generally, the credential is some configuration entity that makes authentication of the source entity to the destination entity possible.

The stored information may also identify a date when the access relationship was identified or an object representing it created in a database. The stored information may further comprise information indicating a date after which the access relationship was no longer valid, and/or a status indication of whether the access relationship is valid and/or shadowed by an earlier authorized key for the same public key.

The stored information may also comprise information about restrictions configured for access, such as a source restriction ("from" restriction) or a command restriction. An example of this are restrictions represented by authorized key options in OpenSSH™.

When a change in collected information is detected, an access relationship that is no longer valid may be deleted from the database or it may be modified to identify a date at which the access relationship ceased to be configured.

106 illustrates use of the stored information. The use may comprise, e.g., querying access relationships, determining access relationships to/from a user account, determining access relationships to/from a host, managing access relationships, auditing access relationships, generating reports and alerts, and visualizing the graph formed by all access relationships.

107 illustrates displaying access relationships. The display may take the form of visualizing a graph formed by the access relationships on a host level (incoming and outgoing trust relationships for each host) or user level. The display may be restricted to a subset of the access relationships. The access graph may also be displayed in a nested form and the partitioning used for such nested display may be precomputed.

In the following processing of changes to authorized keys is considered. Authorized keys for protocols such as e.g. OpenSSH™ can be configured in one or more files and optionally directories that are processed in a well-defined order. The order of configured authorized keys is relevant as a prior configured authorized key shadows any later configured authorized keys with the same public key, and the authorized keys may have different options and restrictions configured for them. Furthermore, many organizations want to track the lifetime of each authorized key, and do not want to consider a key changed when only unrelated keys in the same authorized keys file are modified.

Figure 2:
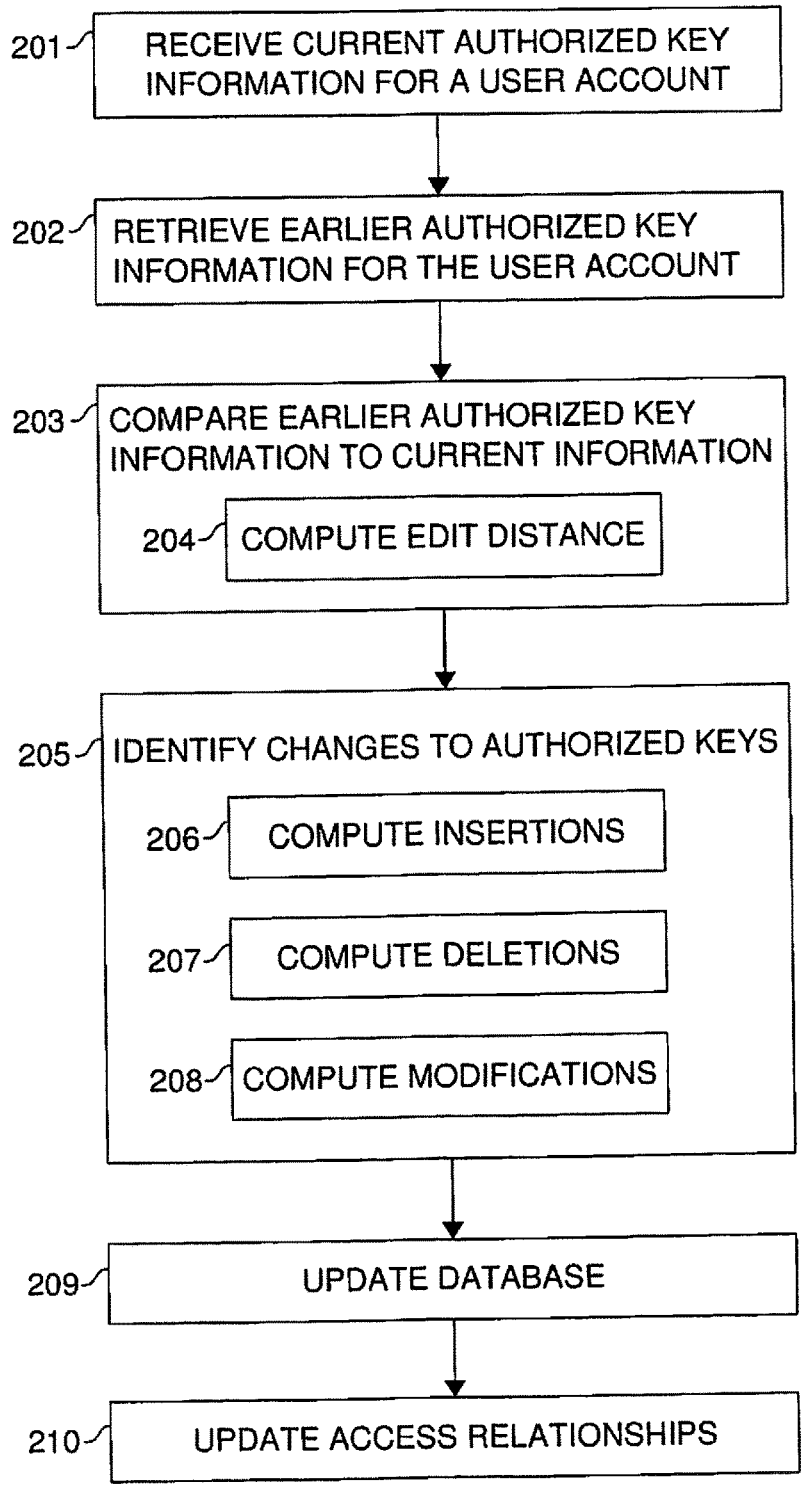
FIG. 2 illustrates processing of collected authorized key information for a user.

A solution is presented for identifying how which authorized keys have relevant changes with reference to FIG. 2 illustrating processing of collected authorized key information for a user in an embodiment. In this aspect changes to authorized keys are correlated and processed. Identity key information may be processed in a similar fashion. It can be advantageous to treat identity keys to be in the order in which they would be processed by a client, e.g. by an SSH client, just as authorized keys would be considered as being in the order in which they would be processed by a server, e.g. an SSH server.

New authorized keys are received 201 for at least one user account. The information may be received, e.g., as a result of the collection stage. The information may originate from configuration files on one or more hosts, directories, and/or databases. Is noted that the disclosure is not limited by the origin of the new information, how it is preprocessed to derive the new authorized keys, or how frequently updated information for the same user account(s) is received, nor to limit the nature of receiving. Instead, what is important in here is that new information becomes available, by whatever means.

Earlier authorized keys for the at least one user account are retrieved 202. They may be, e.g., read from an SQL database.

The discovered new authorized keys are compared to earlier authorized keys at 203. Advantageously, the comparing determines which authorized keys have been inserted, deleted, and/or modified since the earlier authorized keys were received. Advantageously, an algorithm that computes substantially the smallest set of such operations is used.

In an embodiment the authorized keys are converted to a string whose symbols are identifiers for the key pairs used in the authorized keys. An algorithm can be used for computing an edit distance between the string representing the earlier authorized keys and the string representing the new authorized keys. According to a more a precise example, the edit steps needed to get to the new string from the earlier string are defined. An example of such algorithm is the Levenshtein distance. An example of how to determine the edit steps is given by the "diff" program in Unix/Linux. The "diff" program with the "-u" option can be used for computing the steps, if the strings are represented as files where each line contains an identifier for a key. According to one alternative, the equivalent of "diff" can be used on the raw list of authorized keys. This approach may not however permit distinguishing modifications from insertions and deletions as easily as the first mentioned.

Authorized keys determined as equal in a symbol-for-symbol (symbol representing key pair) can then be inspected for changes in individual attributes. The attributes can be such as options specified for each authorized key.

The changes to authorized keys are identified at 205 based on the results of the comparison. When the edit steps are available, insertions can be computed at 206 as those authorized keys entries whose symbols needed to be inserted to get to the new string; deletions can be computed 207 as those authorized keys whose symbols needed to be deleted to get to the new string; and modifications can be computed 208 by comparing the authorized keys entries whose symbols (key pairs) remained unchanged to determine which attributes, if any, of the authorized keys have changed. Modifications are those cases where there is some change.

The database is then updated at 209 according to the identified insertions, deletions, and modifications. New records may be inserted to the database to insert new authorized key objects in the database; existing records may be deleted from the database to reflect the deletion of the corresponding authorized key entries (or alternatively, the records may be marked as having been deleted, possibly by writing a timestamp indicating when they were deleted into a field of the records), and records whose attributes have changed may be modified (e.g., new values updated to fields). Any changes may also be logged in an audit log or in key history records.

When an authorized key is replaced by another key (e.g., it has been rotated or rekeyed), that may be treated as an insertion and a deletion, or it may be identified as a replacement.

In a sense, each authorized key in the new and earlier data is classified into categories for unchanged, insert, and deleted keys, and possibly also for replaced and/or modified keys. Keys in each category form a set of keys. The set can be expressly represented or only implied.

In an embodiment, each authorized key is assigned a sequence number indicating its location in the order in which authorized keys would be processed by an applicable server, e.g. SSH server. Insertions may change sequence numbers of keys that would not otherwise change. Advantageously, a change in a sequence number is not treated same as other modifications of an authorized key. In particular, it may not make sense to log the change in the sequence number in an audit log, as the authorized key itself did not change.

In some SSH implementations, if there are multiple authorized keys entries configured for the same key pair, only the first of them will actually be used. There may also be duplicate authorized keys entries. Advantageously, duplicate authorized keys are detected and a notification about them is provided to a user. Furthermore, advantageously authorized keys entries that are shadowed by another authorized keys entry, i.e., never actually processed by an SSH server because there is an earlier authorized keys entry for the same key pair, are identified. Such authorized keys may be ignored, or they may be stored in the database with a marking that they are currently shadowed. Deletion of another authorized key entry may unshadow another authorized keys entry, and such unshadowing may be treated as a modification of that other authorized keys entry. Access relationships resulting from shadowed authorized key entries may be deleted or they may, e.g., be marked with an indication that they can never actually be used because the authorized key is shadowed.

It is anticipated that in most cases only a few if any authorized keys configured for a user are determined to change compared to previously obtained configuration information. The computed insertions, deletions, and modifications can be used to trigger updating access relationships 210 involving the affected authorized keys.

Examples of representing access relationships in a computerized environment are described next. A computing environment can comprise a large number of computer devices where automated access between the computers is desired to facilitate efficient operations such as system administration, auditing, data transfer and integrating of processes, such as business, security and/or policy based processes. Such automated access can be configured using, e.g., SSH keys, Kerberos keytabs, host-based authentication, stored passwords and so on. A data structure is disclosed for representing such access relationships in a computerized system that enables fast updates and efficient queries in an access graph.

Figure 3:
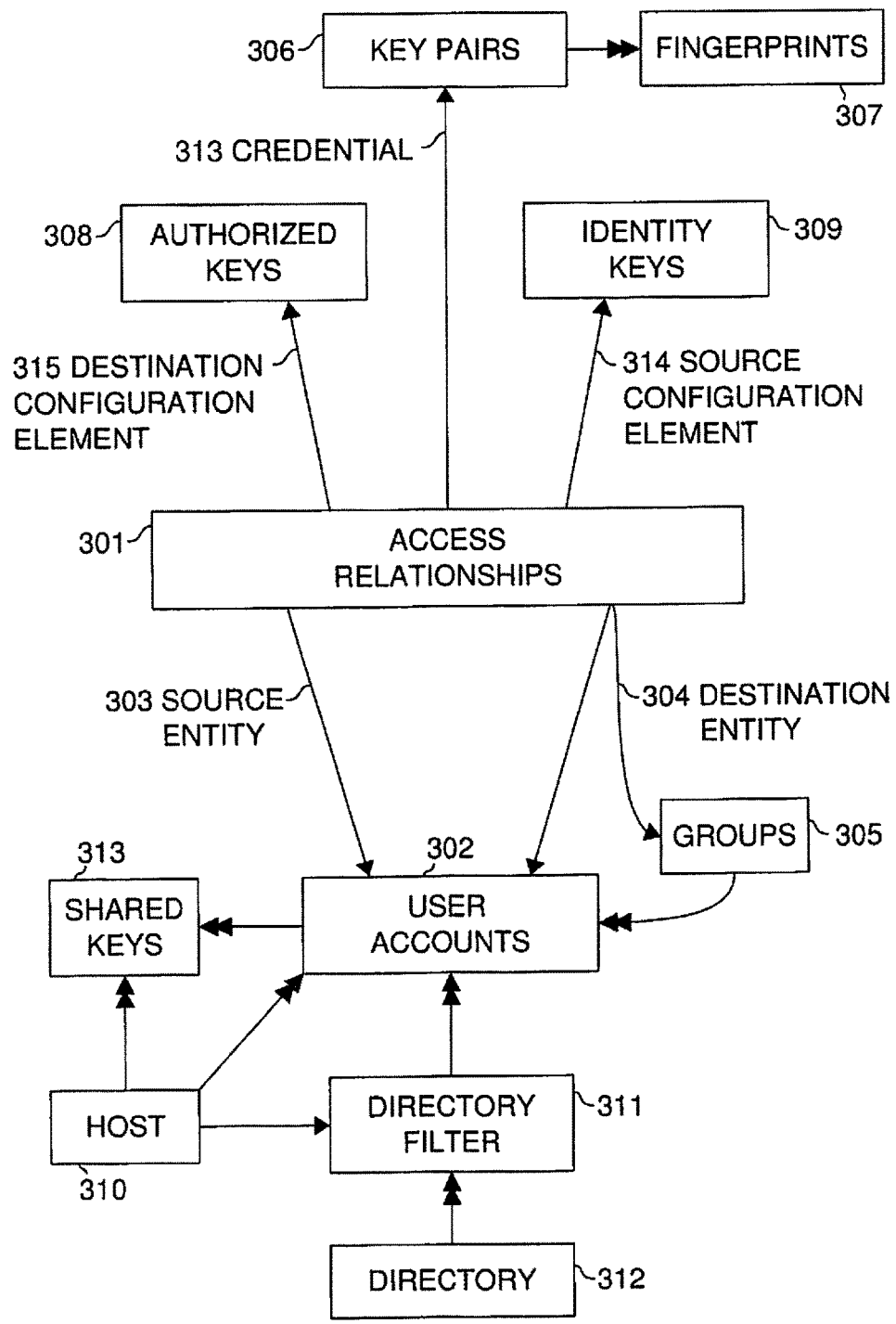
FIG. 3 illustrates a data structure for representing access relationship information.

FIG. 3 illustrates an example of a data structure for representing access relationship information. Advantageously, the various objects are stored as one or more records in a relational database, such as MS SQL™ database, Oracle™, or PostgreSQL™ database in a non-volatile memory. However, they could also be stored in non-relational data stores.

Objects 301 represent access relationships. They are linked to various other objects, and may comprise, e.g., an identification 303 of one or more source entities, identification 304 of one or more destination entities, identification 313 of one or more credentials, identification 314 of one or more source configuration elements (such as identity keys/private keys 309), and/or identification 315 of one or more destination configuration elements (such as authorized keys/public keys 308). The credentials may be e.g. key pairs 306 which may be associated with one or more fingerprints 307. SSH keys are an example of appropriate credentials. However, there can also be objects for other kinds of credentials than SSH keys, such as Kerberos credentials, host-based access, passwords, methods/parameters for obtaining a password or key from a vault, and/or certificate-based access.

A credential relates to the authentication method using which the access relationship is configured. For example, SSH keys are used for configuring access relationships using SSH public key authentication, and Kerberos credentials can be used for configuring authentication using Kerberos or GSSAPI (Generic Security Services Application Program Interface) authentication.

An access relationship may also be associated with an indication of the time or date when it was created or discovered, and an indication of whether it is still valid. For example, an indication when an access relationship ceased to be valid can be provided. Such indication may not present or have a special value if the access relationship is still valid.

It may be possible for a key pair record to exist without its public key being known, the key pair only being identified by one or its fingerprints. Since different fingerprints may be used e.g. by different SSH implementations, it may be possible that there be more than one key pair object actually referring to the same key pair if the key pair objects were created in response to seeing a previously unknown fingerprint in syslog data. Once the public key corresponding to such fingerprints is learned by obtaining configuration data for it, the separate key pair objects corresponding to it may be merged into one object, and references to any merged key pair objects replaced by a reference to the remaining object.

Objects representing user accounts 302 may represent local user accounts at a host and be linked to objects representing hosts 310. They may also represent user accounts in a directory and be linked to a directory 312 and/or objects representing directory filters 311. The latter can be specifications which users from a directory exist on or can access a particular host, possibly specified via groups of hosts. Objects representing groups 305 may also be used as destination entities, and may be used to represent that the access relationship applies to all users in the group, on all hosts that the users in the group have access to. It is noted that different users in the group may have access to different hosts.

Shared keys 313 may be stored on NFS (network file system) volumes and be used on many hosts and possibly by many user accounts. On the other hand, the same user account on a directory might use a different NFS server on different hosts and thus relate to different sets of shared keys. Also other kinds of credentials, such as Kerberos credentials, could be shared in a similar fashion and represented similarly in the database. Shared credentials could include both shared private keys and shared authorized keys.

User account objects may be created to represent, e.g., a user in a directory, a user on a particular host (e.g., if the user is local or is a directory user with keys stored in a local directory), a user with a particular set of shared keys, or a user account on a set of hosts wherein each host in the set has the same set of shared credentials configured. The user account objects actually relating to the same user or person may be linked together so that all keys and access relationships relating to the same user can be quickly found in a single SQL query.

Directory filters may be used to represent all hosts that get the same set of user accounts from one or more directories. This enables whatever conditions apply to existence or accessibility of user accounts on particular hosts to be pre-evaluated, without having to be re-evaluated every time information is queried. Directory filters can be used to represent groups of hosts that get the same results from such evaluations and may be maintained as host configuration is scanned and as information from directories such as LDAP directories and Active Directories is collected.

Updating access relationship objects in a database will be considered next. When authorized keys or identity keys configured for an entity (e.g. a user account) change objects representing access relationships are updated. Access relationships that should no longer be valid are identified and they are deleted or their status updated. Access relationships that should exist but do not exist in the database are identified and inserted in the database. Changes in access relationship properties are identified and updates are made to the database.

Figure 4:
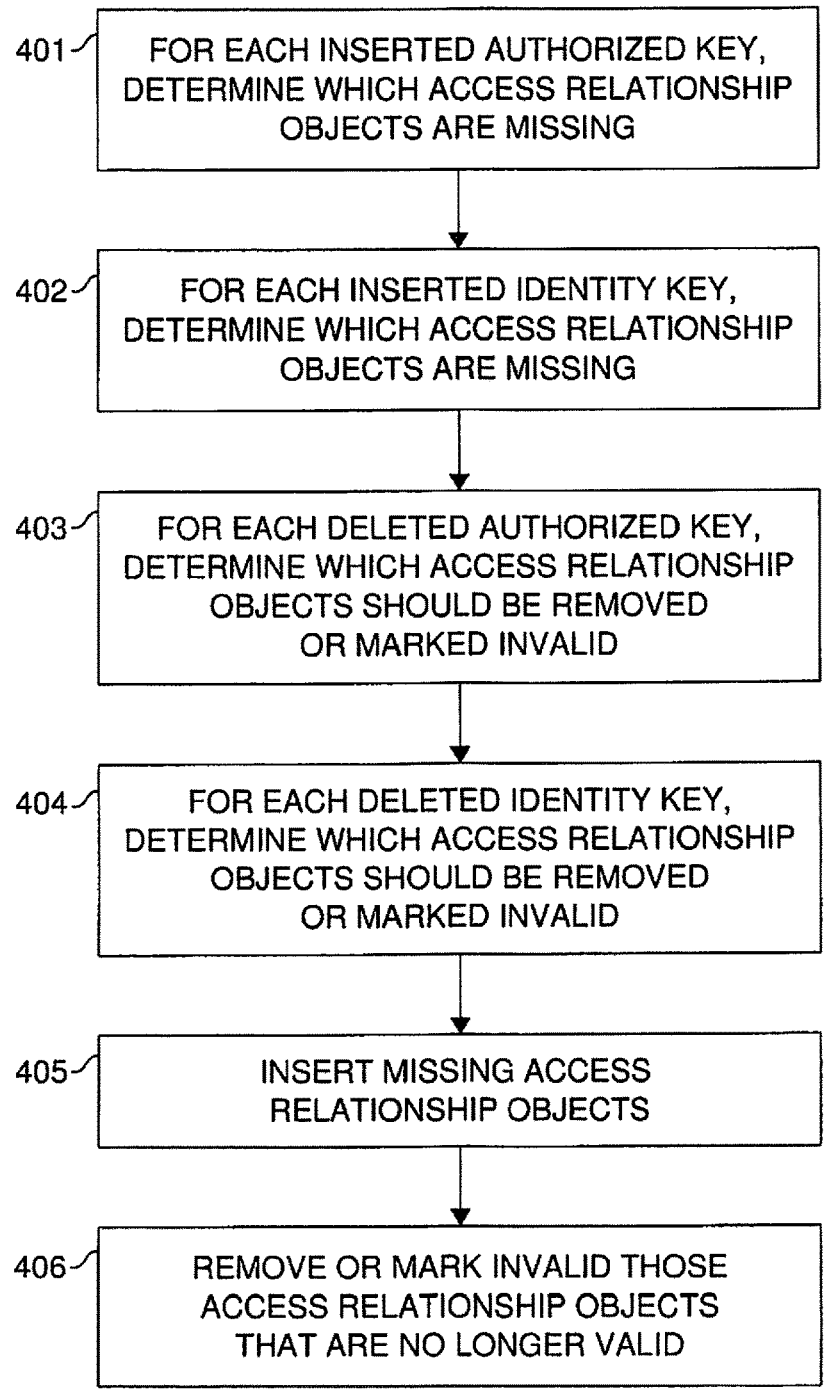
FIG. 4 illustrates updating access relationships when authorized keys or identity keys change.

FIG. 4 illustrates an example for updating access relationship objects in response to inserted or deleted authorized keys and/or identity keys. Modified keys are treated as deletion followed by an insertion in this context; however, it would also be possible to have a special updating mechanism for them that updates existing access relationship objects to reflect the modification.

For each inserted authorized key, it is determined which access relationship objects are missing 401. This can advantageously be implemented using a single SQL query that joins an inserted authorized key object with those identity key objects for the same key pair for which there does not exist an access relationship object that uses the authorized key object as its destination configuration element and the identity key object as its source configuration element. It is possible constrain this by other attributes.

For each inserted identity key, it is determined which access relationship objects are missing 402. This can advantageously be implemented using a single SQL query that joins an inserted identity key object with those authorized key objects for the same key pair for which there does not exist an access relationship object that uses the authorized key object as its destination configuration element and the identity key object as its source configuration element. Again, it is possible to further constrain this by other attributes.

For each deleted authorized key, it is determined which access relationship objects should be removed or marked invalid 403. This can be advantageously implemented using a single SQL query that searches for access relationship objects that use the authorized key as their destination configuration object and that have not already been marked invalid.

For each deleted identity key, it is determined which access relationship objects should be removed or marked invalid 404. This can be advantageously implemented using a single SQL query that searches for access relationship objects that use the identity key as their source configuration object and that have not already been marked invalid.

Access relationship objects that were determined as missing are inserted 405. This can be implemented using SQL insert statements.

Access relationship objects that are no longer valid are removed or marked invalid 406 (these are the objects that should be removed or marked invalid). Removing an object can be implemented using an SQL delete statement. Marking an access relationship object invalid may mean setting a field in the access relationship object to indicate it has ceased to be valid, for example by writing the current time and/or date to a field of the access relationship object to indicate it was no longer valid after that date. This can be implemented using SQL update statements.

In a different embodiment, each access relationship object comprises a count indicating how many identity key-authorized key combinations indicate that the access relationship should exist. When a new access relationship object is inserted, it is inserted with a count of one. When it should be inserted again, but it already exists, the count is incremented. When it should be deleted, the count is decremented. If the count reaches zero, the access relationship object is removed or marked invalid. It would be equivalent to add a constant to all count values or to multiple all count values by a non-zero constant, or represent counts using strings or other representation convertible to a number.

Besides an SQL join, any other mechanism for matching identity keys with authorized keys involving the same key pair could be used. For example, exhaustively looping over all authorized keys and identity keys and comparing them would be a possibility, as would be a lookup of matching authorized keys for each inserted identity key or vice versa. The lookup could be implemented, e.g., using an index data structure or using separate SQL queries.

Figure 5:
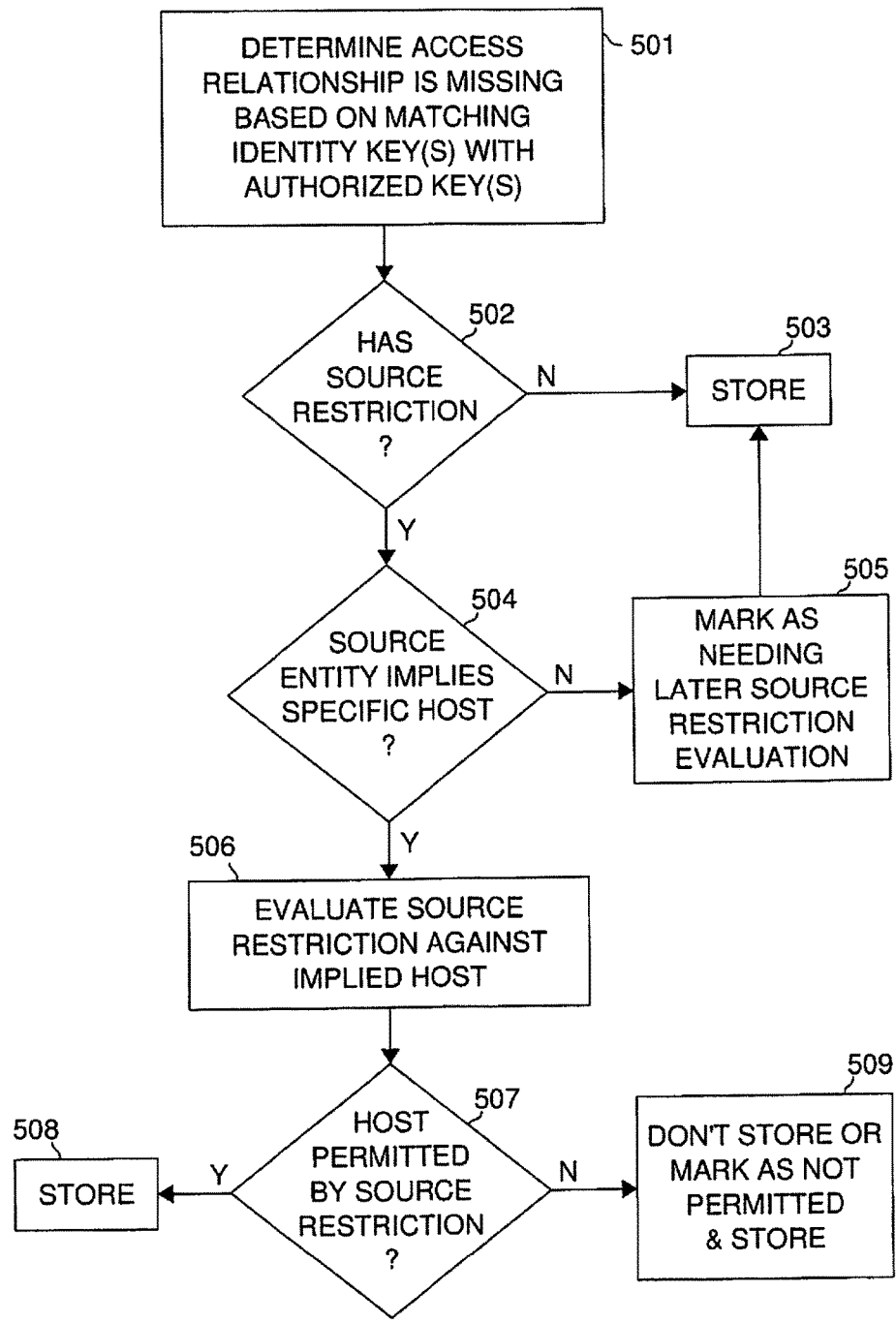
FIG. 5 illustrates filtering identified access relationships by source restrictions.

Not all access relationships indicated by identity key and authorized key matching are necessarily usable in practice. For example, SSH authorized keys can be configured with a source restriction, an option specifying which hosts (IP addresses, subnets, and/or host names) the authorized key can be used from. Filtering identified access relationships by source restrictions can be provided to address this. In the filtering, in addition to matching private keys against authorized keys, source restrictions (e.g., "from" option in an SSH authorized keys file) are evaluated against information about one or more entities (e.g., users or hosts) having access to the private key to determine if the entities are permitted to use the authorized keys. An access relationship might not be stored or considered to exist if such use is not permitted. Alternatively or in addition, such situations may be trigger alerts, audit reports, or be displayed FIG. 5 illustrate filtering of identified access relationships by source restrictions. The filtering may result in eliminating some objects representing access relationships, reducing the size of the tables used for storing such objects. The filtering may also be used to cause access relationships not matching the filter to be marked as not actually usable, or violating a source restriction constraint. Such violations may be of interest and may be listed in a report, made available in a user interface, or trigger alerts. Furthermore, attempts to actually use a key in violation of a source restriction (as detected, e.g., by parsing syslog messages generated by SSH servers) could be an indication of an attempted attack and could be cause for triggering an alert.

Source restrictions in SSH keys may use a variety of complicated patterns, including regular expressions. It is not always possible to determine from a source restriction exactly which hosts it will permit. However, it is possible to evaluate a source restriction with respect to information about a particular host, and determine whether that host is permitted.

Access relationships are usually between user accounts, although can also be specified between other kinds of entities. Local users on a host are bound to a particular host, and it is possible to evaluate whether access from such account is permitted by a source restriction. However, user accounts defined in directories may be exist on multiple hosts, only some of which may be permitted by a source restriction. In such cases, the result of evaluating the access relationship may vary depending on which host the user tries to access from. Similar issues may occur with shared keys.

One possible approach to access relationships whose source or destination is not bound to a single host would be to enumerate all hosts and accounts on which their source and destination can be present, and evaluate source restrictions separately for each possible source host and account, and insert access relationship objects for each such combination, or those permitted by the source restrictions. However, an organization may have tens of thousands of users that are present in computing clusters comprising tens of thousands of servers. Generating, evaluating, and storing all combinations may become computationally prohibitively expensive. Yet in many organizations, the majority of keys are used with host-local user accounts.

While source restrictions have historically been uncommon, their use is rapidly increasing as organizations tackle key management and see source restrictions as a good way of restricting the use of copied keys.

FIG. 5 illustrates filtering identified access relationship by source restrictions in an embodiment. First it is determined that an access relationship object is missing based on matching identity key(s) with authorized key(s) 501 (see FIG. 4). It is checked whether an access relationship is subject to a source restriction 502 (e.g., by checking whether the authorized keys entry has a "from" option). If it has no source restriction, an object for the access relationship is stored 503. If it has a source restriction, it is determined whether the source entity of the access relationship implies a specific host 504 (e.g., a local user account on a host implies that host). If not, the access relationship is marked as needing later source restriction evaluation, and an object for it is stored 503. If a specific host is implied, the source restriction is evaluated against the implied host 506. The evaluation may use, e.g. the IP (Internet Protocol) address (es) and host name or name resulting reverse mapping its IP address using DNS (Domain Name System).

If the implied host is permitted by the source restriction 507, then an object for the access relationship is stored 508 (possibly with a marking indicating it was permitted by a source restriction). If it is not permitted, the access relationship might not be stored or it might be stored by marked as not permitted by an access relationship 509 (so that it can be easily found for reports and it could be eliminated from displays or displayed in a distinct fashion). Additionally, a notification of an access relationship not being permitted by a source restriction may be recorded or logged and an alert may be triggered.

A host may also be implied if a host has access to a private key used as identity key for the access relationship. This can be the case for host-local user accounts.

It would also be possible to implement the filtering after creating one or more access relationship objects, and delete or modify the created access relationship objects based on evaluating source restrictions. Not storing an access relationship would be equivalent to first inserting it and then deleting it.

Different security implementations may use different syntax. For example, different SSH implementations use different syntax for source restrictions (e.g., Tectia SSH Server™ and OpenSSH™ use different syntax), it may be advantageous to convert source restrictions to a common syntax before evaluating them. Common syntax here means a unified representation that can represent source restrictions for at least two implementations in the unified way, without altering the meaning of the source restrictions. The conversion may comprise converting regular expression to one canonical syntax (e.g., the syntax used in the Python™ programming language). Source restrictions may also be stored in a database in the common syntax to facilitate their easier evaluation at a later time.

An aspect is determining user accounts and access relationships that exist on a particular host. The determining can be frequently provided when using and/or displaying access relationships. The determining can be fast. In certain computerized environments, automated access may be configured using groups and directory accounts that are present on more than one host. Methods and data structures can be provided for efficiently determining which user accounts exist on a host and which access relationships can originate or terminate at the host. While access relationships are in most cases defined between user accounts, and the user accounts are not necessarily bound to specific hosts, it is common practice, especially in initial inspection of access relationships, to inspect them at host level.

User accounts on a host may include, inter alia, local user accounts on the host and user accounts that exist on the host that are defined in a directory.

Access relationships for a user account may include, inter alia, access relationships defined for the user account itself if it is a local user account on a host using identity keys and/or authorized keys local to the host, access relationships defined for the user account (local or directory) using shared keys, access relationships defined for a user account in a directory (enabling access to all hosts where the user account exists), access relationships defined for a user account in a directory on a specific host permitting access to the user account only on that host (or a group of hosts if the access relationship uses shared keys), and access relationships defined for a group of users, granting access to all user accounts that are members of the group on hosts where those users exist. The access relationships on a host include access relationships for all user accounts on the host.

Some of the access relationships on a host may have a user on the host as a source entity. Some access relationships may have a user on the host as a destination entity. Some of the access relationships may have users on the host as both their source and destination entities. This can be so e.g., if such access relationships lead from one user on the host to another user on the host, or are self-loops, i.e., lead from a user to itself.

Determining which host a user account is local to may be implemented by having a field in an object representing the user account indicating the host that it is local to if it is a local account. Then, all local users on a host can be identified by an SQL query that searches for user account objects identifying that host in the relevant field.

FIG. 3 illustrates certain data structures that make these evaluations more effective. For example, directory filters can be used for quickly determining which directory user accounts exist on a particular host, and indexed SQL joins maybe used for many of the operations effectively. The description herein is based on using data structures similar to those illustrated in FIG. 3. However, the data structures may be structured differently and equivalent algorithms used.

Figure 6:
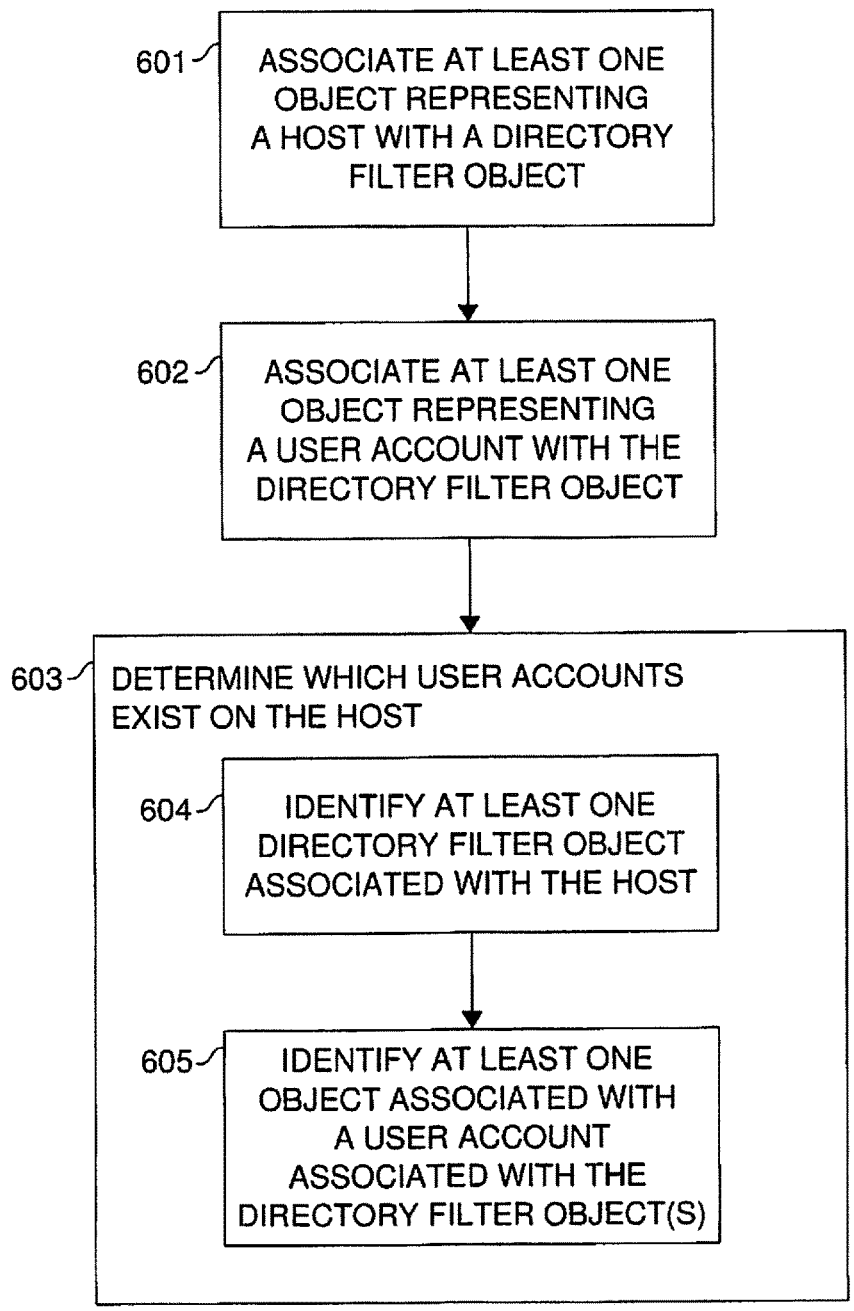
FIG. 6 illustrates determining which user accounts exist on a host.

FIG. 6 illustrates an example for determining which user accounts exist on a host in an embodiment. While processing collected configuration data, when it is determined that a host has been configured to use user accounts from a directory, it is determined what kind of filter is used for determining which user accounts are present on the host. For example, it can be determined which base distinguished name must a user have to be present on the host or which group must the user be a member of. It is expected that many hosts will commonly have the same users, and therefore use the same filter. An object can be created in the database representing each distinct filter. The host objects for all hosts using the same filter are associated with the same directory filter object. A host may be associated with multiple directory filter objects, e.g., if it uses user accounts from more than one directory.

Thus, one or more objects representing a host may be associated with a directory filter object at 601. This association can be many-to-many, and may be implemented, e.g., as a table with one field identifying a host object and another field identifying a directory filter object.

User accounts may be enumerated from the directory. Each user account may be evaluated against all directory filter objects. Objects representing user accounts may be created for some or all accounts defined in a directory. An object representing a user account may be associated with those directory filter objects for which the filter evaluation indicates that the user account will be present on the host.

One or more objects representing a user account may be associated with a directory filter object at 602. This association can be many-to-many, and may be implemented, e.g., as a table with one field identifying a host object and another field identifying a directory filter object.

Determining which user accounts exist on a host 603 may comprise identifying at least one directory filter object associated with an object representing the host at 604. It may also comprise identifying at least one object representing a user account associated with any of the at least one directory filter object at 605. This may be advantageously implemented using an SQL join involving the host-to-directory filter association table and the directory filter-to-user association table.

Determining which user accounts exist on a host may furthermore comprise identifying all local user accounts on the host. These may be found using an SQL query on the user table that specifies that a field indicating to which host the user account is local must identify the host.

Figure 7:
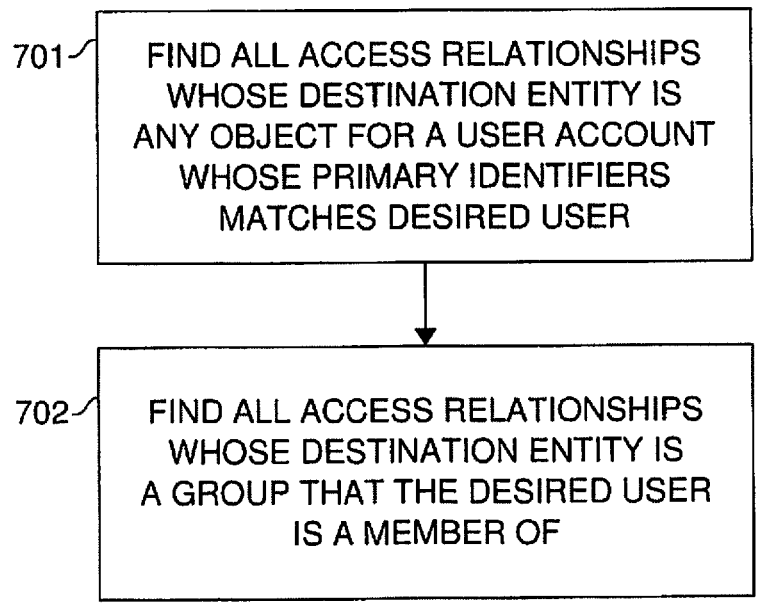
FIG. 7 illustrates determining which access relationships relate to a user account.

FIG. 7 illustrates determining which access relationships relate to a user account, using the given user account as a destination entity. Accounts relating to the user account as a source entity can be obtained by replacing the destination entity by the source entity in the algorithm. In this embodiment, it is assumed that the data structure for representing user accounts, access relationships, and other related concepts roughly corresponds to that illustrated in FIG. 3. Furthermore, it is assumed that there may be more than one user account object relating to an actual user account or person and that all user account objects relating to the same user account or person are linked together by a field, called herein the primary identifier of the user account. In this case all user account objects for the same user account can share the same primary identifier. Different user account objects for the same user account can be used for specifying locally configured keys and access relationships, shared access relationships, access relationships configured for all instances of a directory account, etc.

Alternatively, it would be possible to have one table for a primary user account object and another table for user account aspect object, where an identifier of a primary user account object corresponds to the primary identifier of the user account. Each object in the user account aspect objects table can have a field identifying a primary user account object. The method described herein could be readily adapted for this arrangement and several others.

To determine which access relationships relate to a user account using the user account as a destination entity, a computer device can be configured to look up all access relationships whose destination entity is any user account object whose primary identifier matches that of the user account at 701. The device can further look up all access relationships whose destination entity is a group that the user account is a member at 702.

Looking up all access relationships whose destination entity is any user account object whose primary identifier matches that of the user account can be implemented using a single SQL query that performs a join of a user account table with an access relationship table where the primary identifier of a user account matches the desired user and the identity of the particular user account object matches an identification of a destination entity in the access relationship table.

Looking up all access relationships whose destination entity is a group that the user account is a member of can be also implemented by a single SQL query that performs a join of a group membership table with an access relationship table. A field of the group member table that indicates group member identifier must match the primary identifier of the desired user and the group identifier of the user account must have a primary identifier that matches the desired user. Further, the group membership table must have a group identifier that matches the identification of a destination entity in the access relationship table.

Root trusts, that is incoming access relationships to a root account, can be found by determining which access relations the root account has that have the root account as a destination account. Any root accounts with root trusts can be found by finding all root accounts that have at least one access relationship with the root account as a destination account.

One approach to determining all access relationships on a host is to find all user accounts on the host, and then find all access relationships for each of those user accounts. However, the methods described above do not restrict the returned access relationships for the user accounts to those that can actually involve the host. For example, there may be locally configured keys for a user account in a directory that cannot be used on other hosts where the user account exists, or shared keys that can only be used on those hosts where the user account exists that have those shared keys. Thus, a straightforward approach can result in extra access relationships being returned for a host.

There are scenarios that may need to be considered separately. For example, access relationships specified for a local account or locally specified for a directory account where there is a user account object for the local aspect of the directory account. These may be included only if the implied host matches the desired host. These may also have any source restrictions pre-computed. Another example are access relationships based on shared keys. These should be included if the host is one of the hosts having the shared keys and source restrictions are successfully evaluated. It is possible that these cannot be pre-evaluated in this case. A third example is access relationships based on groups and directory accounts that are not based on local keys or shared keys. These should generally be included if their source restrictions are successfully evaluated.

Successfully evaluating source restrictions can be determined to mean that source restriction permits the access relationship. Empty/non-existent source restrictions always evaluate successfully.

Figure 8:
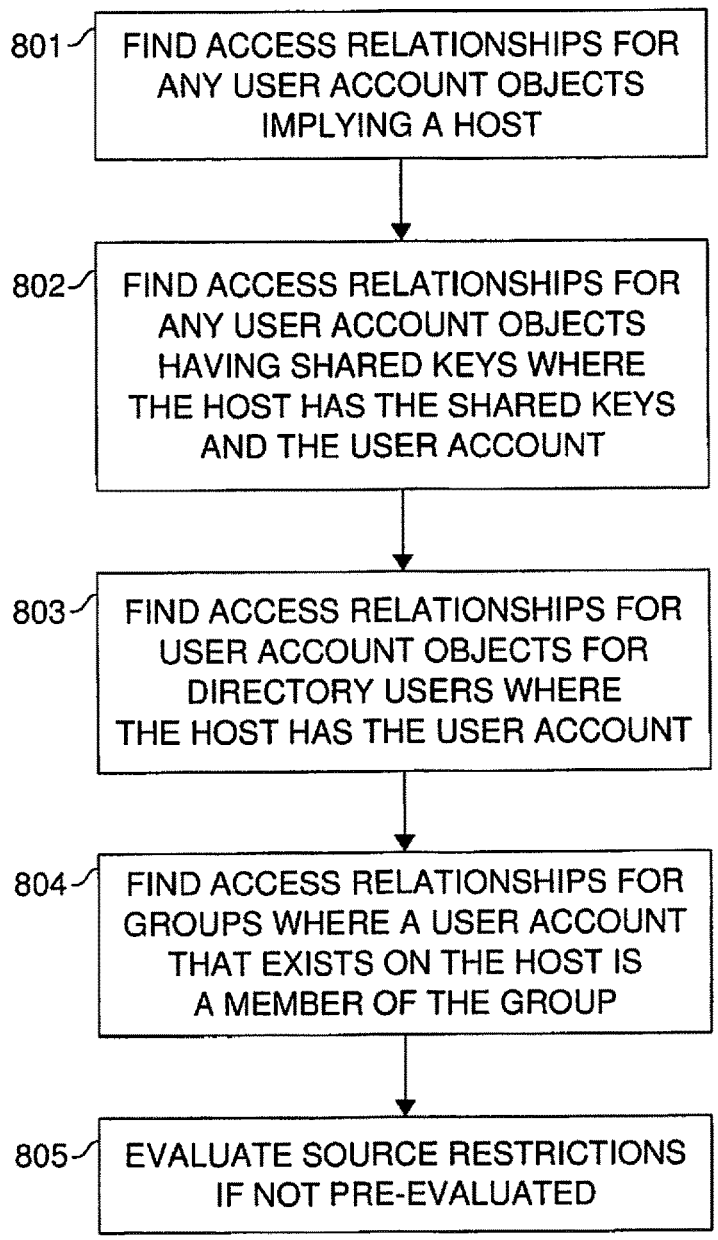
FIG. 8 illustrates determining which access relationships exist on a host, that is, can refer to an user account on the host as a source entity or destination entity.

FIG. 8 illustrates an example for determining which access relationships exist on a host. That is, determination of relationships that can refer to a user account on the host as a source entity or destination entity.

Access relationships for any user account objects implying the host are looked up at 801. This basically looks up access relationships for local accounts on the host as well as access relationships based on keys configured in host-local directories for a user account defined in a directory. This can be implemented as an SQL join between the user account table and the access relationship table.

Access relationships for any user account objects having shared keys where the host has the shared keys and the user account are looked up at 802. Such user account objects represent an aspect of the user account having a particular set of shared keys. Such an user account is advantageously also linked with an object representing a set of shared keys, and hosts having that set of shared keys are linked with the set of shared keys. The lookup can be implemented as a join between a table representing the linkage between hosts and shared keys with the table representing user accounts and the table representing access relationships.

Access relationships for user account objects for directory users where the host has the user account are looked up at 803. The user accounts that exist on a host can be determined using directory filter objects, as described earlier. The implementation can be a join between a table linking hosts to directory filter objects, a table linking directory filters to user accounts, and a table of user account objects.

Access relationships for groups where a user account that exists on the host is a member of the group are looked up at 804. The accounts that exist on a host can be determined using directory filter objects, as described earlier. The implementation can be a join between a table linking hosts to directory filter objects, a table linking directory filters to user accounts, a table specifying memberships in groups, and a table of user account objects.

The source restrictions, if any, in found access relationship objects are evaluated at 805 unless the access relationship objects indicates that they have already been pre-evaluated. Only access relationship objects permitted by source restrictions are advantageously included in the results, though it would also be possible to mark access relationships not matching source restrictions with a suitable marking. If looking for access relationships having a destination entity on the host, the source restrictions are not restricted by the host; however, when looking for access relationships having a source entity on the host, the source restrictions may eliminate one or more of the found access relationships.

According to an aspect pivoting can be determined. The pivoting can be identified e.g. based on an access relationship graph. Pivoting in the context of SSH key based access means an arrangement enabling access to a first user account using one key and then access a second user account from the first user account using a key that the first user account has access to. It can be determined whether a particular user account can be used for pivoting and which user accounts may be used for pivoting. The mechanism can further be extended to pivoting involving different authentication methods for access to the first user account and for access to the second account.

Figure 9:
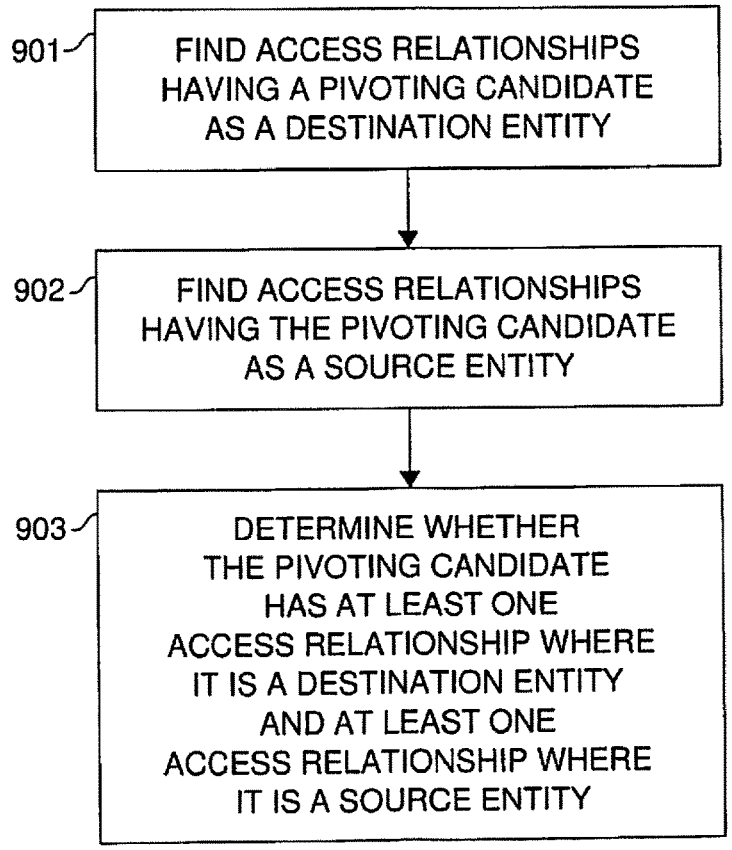
FIG. 9 illustrates determining whether a pivoting candidate (user account or host) can be used for pivoting.

Some security policies forbid pivoting, that is, having a user account (or possibly host in some scenarios) with both incoming access relationship (i.e., one having the user account as a destination entity) and an outgoing access relationship (i.e., one having the user account as a source entity). FIG. 9 illustrates an example for determining whether a pivoting candidate (user account or host) can be used for pivoting. Access relationships having the pivoting candidate as a destination entity are looked up at 901. Access relationships having the pivoting candidate as a source entity are looked up at 902. It is determined at 903 whether the pivoting candidate has at least one access relationship having the pivoting candidate as a destination entity and at least one access relationship having the pivoting candidate as a source entity. If so, the pivoting candidate can be used for pivoting.

It can be sufficient to look up only the first access relationship in each of the 901 and 902 steps, or even to just determine whether at least one such access relationship exists in each case, without actually reading the access relationship. However, it may be desirable to evaluate source restrictions before considering an access relationship as existing.

Looking up access relationships can follow the methods presented for looking up access relationships for a user account or for a host, and take into consideration the different ways in which an access relationship may be represented for an entity.

Any of the aspects and elements described herein may be omitted, reordered, or combined to form new embodiments. No ordering on steps of processes or elements of embodiments is implied unless necessary in a particular context (even describing what is done first in a drawing is not intended to impose an ordering constraint in alternative embodiments). Some steps may be implemented as a continuous ongoing process. Any process step may be implemented as computer executable instructions, software modules, digital logic, or computer hardware, or any combination thereof, as applicable. Computer-executable instructions for causing a computer to perform any of the methods may be stored on a non-transitive computer-readable medium (such as RAM, ROM, DVD, file server, web server).

Figure 10:
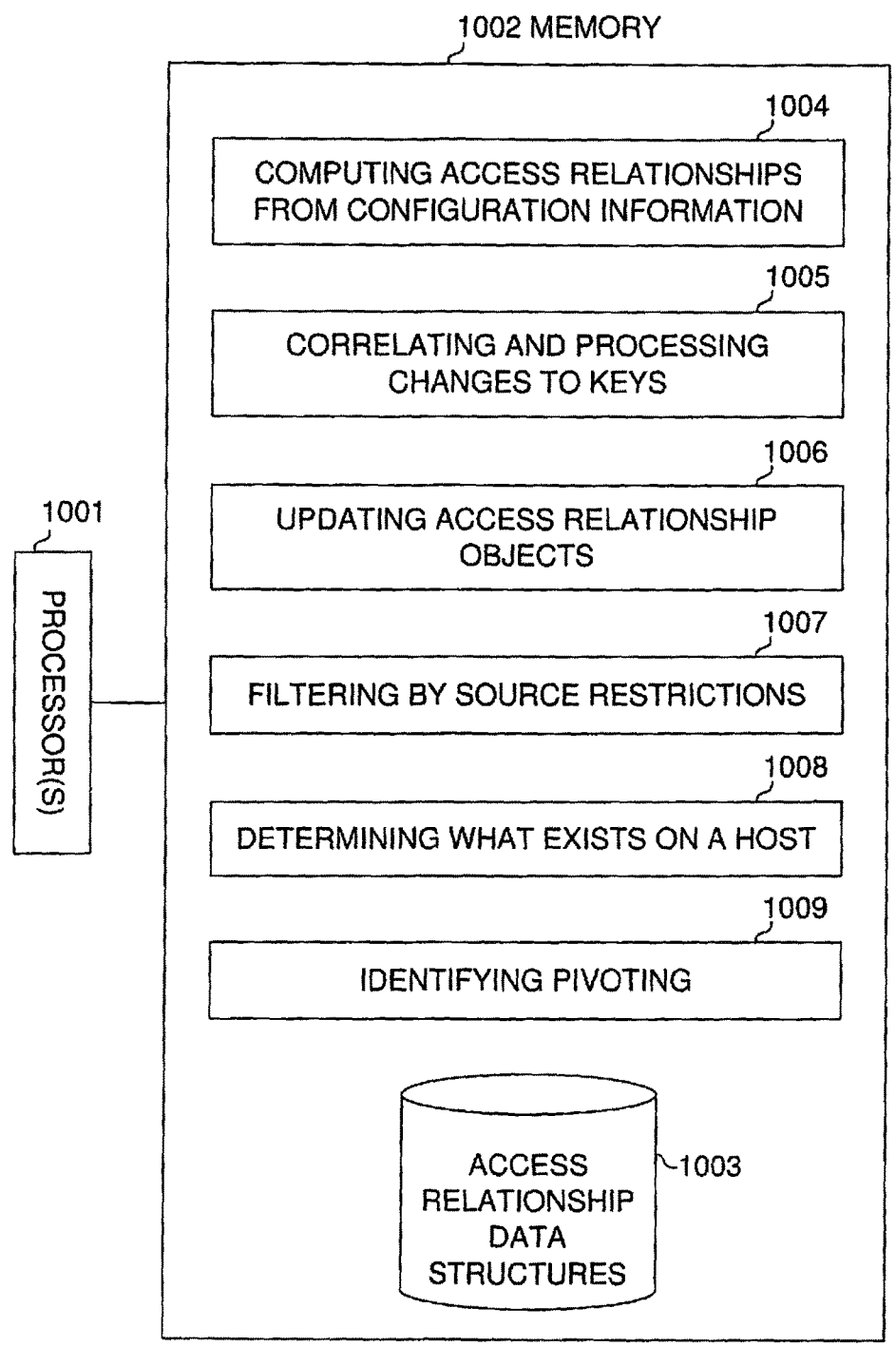
FIG. 10 illustrates an apparatus embodiment, including a non-transient computer readable medium.

FIG. 10 illustrates an apparatus in accordance with an embodiment. The embodiment may comprise one or more computing nodes that together implement one or more of the methods presented herein. The apparatus comprises one or more processors 1001 connected to a memory 1002 and various other components of a computer known in the art. The memory is readable by the apparatus and comprises working memory, at least part of which is non-transient (e.g., SDRAM) and non-volatile memory (e.g., magnetic disk or flash memory). The memory comprises a database 1003 comprising access relationship data structures (e.g., access relation objects, user account objects, host objects). The database is advantageously stored in non-volatile memory. The memory also comprises various program code means, such as those for computing access relationships from configuration information 1004, correlating and processing changes to configured keys 1005, updating access relationship objects 1006, filtering access relationships by source restrictions 1007, determining what access relationships exist on a host 1008, and identifying pivoting 1009.

In accordance with an aspect there is provided a method for managing authenticators in a computerized system comprising user accounts and hosts, the method comprising determining at least one change to authorized authenticators based on comparison of new authorized authenticator information for a user account to an earlier authorized authenticator information for the user account, and determining actions leading from the earlier authorized authenticator information to the new authorized authenticator information.

The actions can comprise at least one of insertion, deletion and/or modification of authenticator information. The determining of actions leading from the earlier authorized authenticator information to the new authorized authenticator information can comprise use of an algorithm for computing substantially the smallest set of such actions. The smallest set can be computed using an edit distance algorithm or Levenshtein distance algorithm using an identification of the key pairs of the authorized keys as the symbols for the strings compared by the algorithm.

The above method may further comprise classifying each new authorized key into a category selected from a set comprising categories for unchanged, inserted, and deleted keys, and in response to a key being classified as inserted, inserting it in a database and in response to a key being classified as deleted, deleting it from a database or marking it as deleted. The set may further comprise a category for replaced keys, the method further comprising, in response to a key being classified as replaced, processing the old authorized key entry as if it has been deleted and the new authorized key entry as if it had been inserted. The set may further comprises a category for modified keys, the method further comprising, in response to a key being classified as modified, updating information about the authorized key in the database.

The method may further comprise, in response to the key being determined as otherwise unchanged but its sequence number in among authorized keys changing, updating a sequence number in the database record representing the authorized key.

The method may further comprise determining for each authorized key whether it is shadowed by an earlier key in a new authorized key information, and treating an otherwise unchanged authorized key as modified if the result of this determination is different for the authorized key entry in the new authorized key information compared to what it was for the same authorized key entry in the old information.

The method may further comprise, in response to an authorized key being modified, recording information about the change in an audit log.

The method may further comprise, in response to an authorized key being inserted or deleted, updating information about access relationships in a database to reflect the change in configured authorized keys.

According to another aspect a method comprises storing at an access relationship storage at least one access relationship object representing access relationships between a source entity and a destination entity, wherein a source entity is able to access a destination entity, determining, for at least one inserted authenticator, at least one access relationship which has no corresponding access relationship object in the access relationship storage, and creating an access relationship object for representing the determined access relationship in the access relationship storage.

The determining can be performed in response to insertion of a new authenticator.

The method of this aspect may further comprise determining, for at least one deleted authorized key, which access relationship objects for access relationships involving the deleted authorized key should be invalidated, and removing or marking as invalid or otherwise disabling access relationship objects determined to be invalidated. The method may further comprise determining, for at least one deleted identity key, which access relationship objects for access relationships involving the deleted identity key should be invalidated. Marking as invalid can comprise writing an indication of a point of time after which the access relationship was no longer valid in a field of the access relationship object. A count can be maintained in at least one access relationship object. The count can indicate how many identity key-authorized key combinations indicate that the access relationship should exist.

The determining may comprise an SQL query using a join of a table comprising objects representing authorized keys with a table comprising objects representing identity keys on a field identifying a key pair together with a test for whether an access relationship exists that uses a joined identity key as a source configuration element and a joined authorized key as a destination configuration element.

According to still another aspect a method comprises configuring at least one source restriction for access relationships restricting access from a source entity to a destination entity, matching an identification of an authenticator against a configured authorized authenticator, evaluating a source restriction configured for the authorized authenticator against information about one or more entities having access to the authenticator, and storing information about an access relationship related to the authorized authenticator in a collection of access relationships if the access relationship is permitted by the source restriction.

The method of this aspect may further comprise, when the access relationship is not permitted by the source restriction, at least one of storing the access relationship with an indication that the access relationship as not permitted, not storing the access relationship, and updating information about the access relationship to indicate that it is no longer permitted by a source restriction.

The method of this aspect may further comprise converting a configured source restriction into a common syntax before evaluating the source restriction. The source restriction can be stored in a database in the common syntax. The converting can comprise converting a match pattern into a regular expression with a predefined syntax.

The method of this aspect may further comprise, in response to evaluation indicating that an entity that has access to the private key, providing an indication that access by that entity is not permitted by the source restriction, and reporting the situation in an alert, a report, and/or in a display.

According to still another aspect a method comprises associating at least one object representing a host with a directory filter object, associating at least one object representing a user account with the directory filter object, and determining which user accounts exist on the host based on determining at least one directory filter object associated with an object representing the host and determining at least one object representing a user account associated with the directory filter object.

The method of this aspect can comprise, when determining which user accounts exist on the host further, identifying at least one object representing a local user account on the host.

It can be determined which access relationships originate from the host by identifying at least one object representing an access relationship that references an object representing a user account associated with a user account that exists on the host as a source entity.

It can also be determined which access relationships terminate at the host by identifying at least one object representing an access relationship that references an object representing a user account associated with a user account that exists on the host as a destination entity.

Determining access relationships that reference a host can comprise looking up access relationships, if any, for any user account object that comprises an indication that the user account is local to the host or represents keys configured for a directory user that are local to that host and/or looking up any access relationship objects, if any, for any user account object having shared keys where the host has the shared keys and the user account.

Determination whether the host has the user account can be determined using a directory filter object that specifies which user accounts from a directory exist on the host.

A user account object having shared keys can also identify a set of shared keys.

Access relationship objects may be analyzed for one or more groups having as a member a user account that exists on the host.

A source restriction can be evaluated for at least one access relationship that has a configured source restriction and for which the source restriction has not been pre-evaluated using the host as a source entity of the access relationship. The method can further comprise removing the access relationship from found access relationships if the evaluation indicates that it is not permitted by the source restriction.

According to still another aspect a method comprises storing information on access relationships between source entities and destination entities, wherein a source entity is able to access a destination entity, storing information on user accounts in user account objects, wherein at least one user account has at least two user account objects, determining, for an user account, which access relationships have the user account as a destination entity or as a source entity based on looking up access relationships whose destination entity or source entity is associated with at least one user account object comprising an identifier identifying the user account.

According to the method of this aspect the determining which access relationships have a user account as a destination entity or a source entity further comprises looking up access relationships whose destination entity or source entity, respectively, indicates a group that the user account is a member of.

The looking up can comprises an SQL query joining a table comprising user account objects with a table comprising access relationship objects.

A method can also be provided comprising determining which access relationships use a user account as a destination entity or a source entity based on looking up access relationships whose destination entity or source entity, respectively, indicates a group that the user account is a member of.

According to still another aspect a method comprises determining a pivoting entity in a system comprising entities and access relationships between the entities, an access relationship determining a source entity and a destination entity where the source entity has right to access the destination entity, the method comprising determining an entity as a pivoting entity if the entity has at least one access relationship where the entity is a destination entity and at least one access relationship where the entity is a source entity.

According to an aspect the pivoting entity is a host or a user account.

An entity can be considered to have an access relationship where the entity is a source entity or a destination entity in response to determination of an access relationship object configured for a user account object or group object associated with the entity. The user account can have both an authorized key and an identity key configured.

In accordance with a method it can be determined which user accounts can be used for pivoting access relationships, wherein an access relationship leads to a user account and another access relationship leads from the user account to another user account. At least one user account can have at least one access relationship that has been configured using shared keys.

In accordance with an aspect a data structure is provided, the data structure comprising at least one object representing a host, at least one object representing a user account on a host, a plurality of access relationship objects representing access relationships between source and destination entities, wherein a source entity can access a destination entity and the access relationship objects comprise identifications of objects representing identifications of objects representing user accounts as the source entities and identifications of objects representing user accounts as the destination entities, the data structure being stored in the non-volatile storage.

The user can be a local user or a user account configured in a directory.

The data structure can further comprise at least one object representing authenticators, wherein an authenticator is an item of information that can be used for authenticating an entity to another entity or for obtaining the information required for authenticating an entity to another entity, and the access relationship object further comprises identification of an object representing authenticators.

At least one of the source entity and the destination entity may not identify a host.

The data structure can be such that the identification of objects identifies a group of objects that further identifies one or more individual objects. The group can be configured in a directory.

The data structure can be stored in a database in non-volatile storage, each of the pluralities of objects being represented by a table or collection, and at least one of the identifications being stored as a field of a record or object in the database, the database being configured to have an index for the field.

Each object representing an access relationship can identify a point of time e.g. a date when the access relationship was created.

Each object representing an access relationship can comprise an indication of whether the access relation is still valid. The indication can identifies a date or another time indication from which the access relationship was no longer valid.

The objects representing access relationships can further comprise an identification of a configuration element used for configuring the access relationship.

The authenticator can be a key, an indication wherefrom an authenticator can be obtained, a password, an identification of a file where a password is stored, or an identification of a method and its parameters for obtaining a password from a vault.

The access associated with an access relationship can comprises a log in operation.

At least one of the source entity and destination entity can identify an object representing a user account on a set of hosts, wherein each host in the set of hosts has the same set of shared authenticators configured. The shared authenticators can include at least one shared private key or at least one shared authorized key.

The data structure can further comprise at least one directory filter object referenced by at least one object representing a host, wherein the directory filter object specifies which user accounts from the directory can access the host.

According to an aspect a data structure comprises a plurality of objects representing access relationships, wherein each access relationship indicates that a source entity is capable of accessing a destination entity, wherein at least one access relationship is configured using an SSH key and at least one access relationship is configured using a different authentication mechanism.

According to an aspect a data structure comprises a plurality of objects representing access relationships, wherein each access relationship defines a source entity capable of logging into a destination entity, the data structure being maintained in non-volatile storage and updated in response to reception of new information about the configuration of at least one host.

All of the above described methods and aspect can be performed by an apparatus comprising at least one processor, and at least one memory including computer program code, wherein the at least one memory and the computer program code are configured, with the at least one processor, to cause the apparatus to perform the given operation.

There can be provided a computer program comprising code means adapted to perform, when the program is run on processor apparatus, any of the herein described method.

The various aspects and features thereof can be combined with other aspects and features thereof.

The description herein has focused mostly on SSH keys. Use of SSH keys can have certain advantage on other authenticators. However, other methods of authentication and authenticators for automated access can equally well be used. For example, Kerberos credentials stored in keytab files can be used for automated access; in that case, the configuration entry at the client is the entry in the keytab file and the configuration entry at the server side may either be non-existent or stored in a directory (possibly as a policy statement, which could be shared by many user accounts). For password-based authentication, the client-side configuration entry might be a file containing the password or configuration data specifying how to obtain a password from a vault. Even for SSH keys, the key could come from a vault and the client-side configuration data could specify how to obtain it from a vault (e.g., specifying an identifier for a key and/or parameters needed to access a vault, such as the vault's IP address).

Any action described as performed by an entity herein may also be caused to be performed by the entity (the actual performance of the action could be implemented by a different entity).

I claim:

1. A method in a computerized system comprising:
configuring, by a credential management apparatus, at least one source restriction for an access relationship restricting access from a source entity to a destination entity;
matching an identification of a particular authenticator against a configured authorized authenticator;
evaluating a source restriction, configured for the authorized authenticator, from the at least one source restriction, against information about one or more entities having access to the particular authenticator to determine whether the access relationship is permitted by the source restriction; and
performing a management action on information of the access relationship related to the authorized authenticator in a record of access relationships in response to determining that the access relationship is not permitted by the source restriction,
wherein the management action includes at least one of storing the access relationship in the record of access relationships with a marking that the access relationship is not permitted, not storing the access relationship, or updating information about the access relationship in the record of access relationships to indicate that the access relationship is no longer permitted by a source restriction.

2. The method of claim 1, further comprising storing the information about the access relationship at a database of the credential management apparatus.

3. The method of claim 1, further comprising storing the information at a non-volatile memory.

4. The method of claim 1, further comprising obtaining the authorized authenticator from a vault.

5. The method of claim 4, wherein the obtained authenticator is for authenticating at least one of:
access by another entity to the source entity,
access by the source entity to another entity, or
user of the source entity to another entity.

6. The method of claim 1, wherein the particular authenticator comprises authentication credential for authentication of the source entity to the destination entity.

7. The method of claim 6, wherein the authentication credential comprises one of an authentication password, a password file, an authorized key, or an identity key.

8. The method of claim 7, wherein the authentication credential comprises a Secure Shell (SSH) key.

9. The method of claim 1, wherein the authenticator comprises one of a Kerberos credential, Kerberos keytab entry, a certificate, a user account file, or a .rhosts file.

10. The method of claim 1, further comprising obtaining the authenticator during boot of the host.

11. The method of claim 1, further comprising determining that the access relationship is permitted by the source restriction, and storing the access relationship in a database holding the record of access relationships as a permitted access relationship.

12. The method of claim 1, further comprising converting the configured source restriction into a common syntax before evaluating the source restriction.

13. The method of claim 12, further comprising storing the source restriction in a database in the common syntax.

14. The method of claim 12, wherein the converting comprises converting a match pattern into a regular expression with a predefined syntax.

15. The method of claim 1, wherein when the evaluation indicates that an access relationship for an entity that has access to a private key used as an identity key for the access relationship related to the authorized authenticator is not permitted by the source restriction, the management action comprises generating an alert, a report, or a display.

16. An apparatus comprising:
at least one processor; and
at least one memory including computer program code, wherein the at least one memory and the computer program code are configured, with the at least one processor, to cause the apparatus to:
configure at least one source restriction for access relationships restricting access from a source entity to a destination entity,
match an identification of an authenticator against a configured authorized authenticator,
evaluate a source restriction configured for the authorized authenticator against information about one or more entities having access to the authenticator to determine whether the access relationship is permitted by the source restriction, and
perform a management action on information of an access relationship related to the authorized authenticator in a record of access relationships in response to determining that the access relationship is not permitted by the source restriction,
wherein the management action includes at least one of store the access relationship with a marking that the access relationship as not permitted, not store the access relationship, or update information about the access relationship to indicate that it is no longer permitted by a source restriction.

17. The apparatus of claim 16, wherein the source entity comprises a virtual computing device configured to operate based on Linux programming language.

18. The apparatus of claim 16, configured to store the information on the at least one source restriction at a non-volatile memory.

19. The apparatus of claim 16, wherein the authorized authenticator is obtained from a vault.

20. The apparatus of claim 19, wherein the obtained authenticator comprises at least one authentication credential for authentication of a source entity to a destination entity.

21. The apparatus of claim 20, wherein the authentication credential comprises one of an authentication password, a password file, an authorized key, or an identity key.

22. The apparatus of claim 16, wherein the at least one memory and the computer program code are configured to further cause the apparatus to, in response to determining that the access relationship is permitted by the source restriction, store the access relationship in a database holding the record of access relationships as a permitted access relationship.

23. The apparatus of claim 16, wherein the at least one memory and the computer program code are configured to further cause the apparatus to convert the configured source restriction into a common syntax before evaluating the source restriction.

24. The apparatus of claim 23, further comprising a database for storing the source restriction in a in the common syntax.

25. The apparatus of claim 16, wherein the at least one memory and the computer program code are configured to further cause the apparatus to convert a match pattern into a regular expression with a predefined syntax.

26. The apparatus of claim 16, wherein the at least one memory and the computer program code are configured to further cause the apparatus to, in response to the evaluation indicating that an access relationship for an entity that has access to a private key used as an identity key for the access relationship related to the authorized authenticator is not permitted by the source restriction, generate an alert, a report, or a display.

27. A non-transitory computer readable media comprising program code for causing an apparatus comprising a processor to perform instructions comprising:

configuring at least one source restriction for access relationships restricting access from a source entity to a destination entity;

matching an identification of an authenticator against a configured authorized authenticator;

evaluating a source restriction configured for the authorized authenticator against information about one or more entities having access to the authenticator to determine whether the access relationship is permitted by the source restriction; and performing a management action on information of an access relationship related to the authorized authenticator in a record of access relationships in response to determining that the access relationship is not permitted by the source restriction, wherein the management action includes at least one of storing the access relationship in the record of access relationships with a marking that the access relationship is not permitted, not storing the access relationship, or updating information about the access relationship in the record of access relationships to indicate that the access relationship is no longer permitted by a source restriction.

\* \* \* \* \*